US010754024B2

(12) United States Patent
Kim (10) Patent No.: US 10,754,024 B2
(45) Date of Patent: Aug. 25, 2020

(54) OBJECT-SENSING SYSTEM FOR VEHICLE AND OBJECT-SENSING METHOD FOR VEHICLE

(71) Applicant: Mando Corporation, Pyeongtaek-si, Gyeonggi-do (KR)

(72) Inventor: Woo Young Kim, Hwaseong-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 336 days.

(21) Appl. No.: 15/805,275

(22) Filed: Nov. 7, 2017

(65) Prior Publication Data
US 2018/0128911 A1    May 10, 2018

(30) Foreign Application Priority Data
Nov. 7, 2016  (KR) .................... 10-2016-0147656

(51) Int. Cl.
*G01S 13/60* (2006.01)
*G01S 7/02* (2006.01)
*G01S 13/931* (2020.01)
(52) U.S. Cl.
CPC .............. *G01S 13/60* (2013.01); *G01S 7/023* (2013.01); *G01S 13/931* (2013.01); *G01S 2013/9321* (2013.01)

(58) Field of Classification Search
CPC ........ G01S 13/60; G01S 13/931; G01S 7/023; G01S 2013/9321
See application file for complete search history.

(56) References Cited

U.S. PATENT DOCUMENTS

| | | | |
|---|---|---|---|
| 2003/0201878 A1* | 10/2003 | Bai | G01S 13/931 340/435 |
| 2012/0323474 A1* | 12/2012 | Breed | B60W 30/04 701/117 |
| 2016/0009284 A1* | 1/2016 | Tokimasa | G01S 13/931 701/96 |

\* cited by examiner

*Primary Examiner* — Marc Anthony Armand
(74) *Attorney, Agent, or Firm* — Hauptman Ham, LLP (57) ABSTRACT

Disclosed is an object-sensing system for a vehicle including: a transmitter configured to transmit a transmission beam in a radiation direction according to a control signal; a receiver configured to receive a reception beam in the radiation direction and output a sensing signal; an object sensor configured to sense an object by analyzing the sensing signal; a lane change sensor configured to sense whether a driving lane is changed; and a controller configured to output a control signal for changing the radiation direction to a first direction associated with the sensed object based on the analysis of the sensing signal, and, when a change in the driving lane is sensed, output the control signal for changing the radiation direction to a preset initial direction.

15 Claims, 10 Drawing Sheets

OBJECT-SENSING SYSTEM FOR VEHICLE AND OBJECT-SENSING METHOD FOR VEHICLE

CROSS REFERENCE TO RELATED APPLICATION

This application claims priority from Korean Patent Application No. 10-2016-0147656, filed Nov. 7, 2016, which is hereby incorporated by reference for all purposes as if fully set forth herein.

BACKGROUND OF THE INVENTION

1. Field of the Invention

The present disclosure relates to object-sensing technology for application to a vehicle.

2. Description of the Prior Art

An object-sensing device including a high-resolution radar sensor that can determine or deduce the distance between adjacent objects is variously used for industrial and military purposes, and is also coming to be commonly used in vehicles for everyday use.

An object-sensing device for a vehicle is necessary technology for implementing an intelligent traffic system, which senses movement of other vehicles or objects moving or stopping within a radius of 250 m or narrower. Accordingly, the object-sensing device for the vehicle may be used for a safe driving system of a vehicle developed for the purpose of preemptively preventing accidents that may occur due to poor weather conditions or a driver's carelessness.

However, the conventional object-sensing device that transmits a transmission beam and senses movement of another vehicle or an object based on a received reception beam may perform erroneous sensing and mistakenly deduce the presence of an object that does not actually exist if it receives a transmission beam transmitted from an opposite vehicle driving in an oncoming lane.

SUMMARY OF THE INVENTION

In this background, an aspect of the present disclosure is to provide object-sensing technology for a vehicle capable of solving a problem of incorrectly sensing the presence of an opposite vehicle driving in an oncoming lane as the presence of an object.

In accordance with an aspect of the present disclosure, an object-sensing system for a vehicle is provided. The sensing system includes: a transmitter configured to transmit a transmission beam in a radiation direction according to a control signal; a receiver configured to receive a reception beam in the radiation direction and output a sensing signal; an object sensor configured to sense an object by analyzing the sensing signal; a lane change sensor configured to sense whether a driving lane is changed; and a controller configured to output a control signal for changing the radiation direction to a first direction associated with the sensed object based on the analysis of the sensing signal, and, when a change in the driving lane is sensed, output the control signal for changing the radiation direction to a preset initial direction.

In accordance with another aspect of the present disclosure, an object-sensing method for a vehicle is provided. The object-sensing method includes: a transmission step of transmitting a transmission beam in a radiation direction according to a control signal; a reception step of receiving a reception beam in the radiation direction and outputting a sensing signal; an object-sensing step of sensing an object by analyzing the sensing signal; a lane-change-sensing step of sensing whether a driving lane is changed; and a control step of outputting a control signal for changing the radiation direction to a first direction associated with the sensed object based on the analysis of the sensing signal, and, when a change in the driving lane is sensed, outputting the control signal for changing the radiation direction to a preset initial direction.

According to the present disclosure as described above, it is possible to provide object-sensing technology for a vehicle capable of accurately sensing an object despite the presence of an opposite vehicle driving in an oncoming lane.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, some embodiments will be described with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

An object-sensing device (for example, a radar sensor) for transmitting a transmission beam and detecting an object based on a received reception beam is widely used for a vehicle. The object-sensing device senses the object based on information between a transmission beam and a normally received beam received after the transmission beam is reflected from an object.

However, when the object-sensing device is used, a problem of erroneously sensing an object may be caused by an erroneously received beam generated due to other causes as well as the reception beam received after the transmission beam is reflected from the object. This will be described in detail with reference to FIG. 1.

Figure 1:
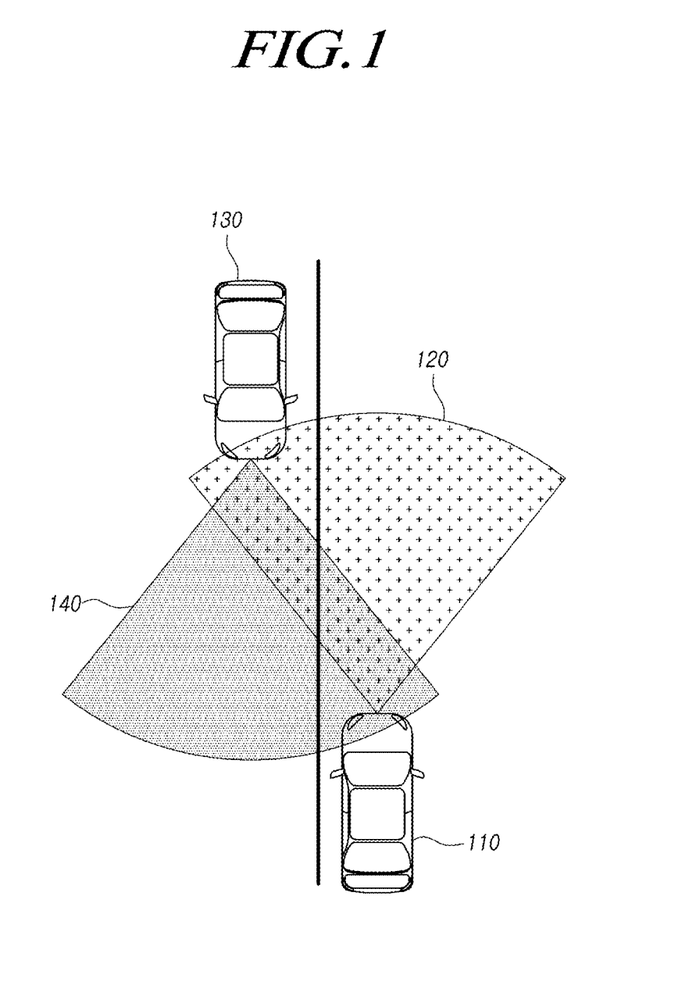
FIG. 1 illustrates an example for describing a problem occurring in a general object-sensing device.

FIG. 1 illustrates an example for describing a problem occurring in a general object-sensing device.

Referring to FIG. 1, the general object-sensing device included in a driver's vehicle 110 may receive a normally received beam and an erroneously received beam. The normally received beam means a beam transmitted from the driver's vehicle 110 in a radiation direction 120 that is received after a transmission beam is reflected from another vehicle 130, and the erroneously received beam means a transmission beam that the other vehicle 130 transmits in a radiation direction 140 and the driver's vehicle 110 directly receives.

In such a situation, illustrated in FIG. 1, the normal object-sensing device included in the driver's vehicle 110 may mistakenly detect the presence of an object between the driver's vehicle 110 and the other vehicle 130 due to the erroneously received beam.

That is, the general object-sensing device senses a forwardly located object based on the normally received beam reflected and received from the forwardly located object, such as another vehicle. When the forwardly located object is another vehicle, the general object-sensing device may also receive an erroneously received beam corresponding to a transmission beam transmitted from the other vehicle, and, accordingly, accuracy of sensing of the object may deteriorate.

Particularly, a radar device serving as an object-sensing device used for Adaptive Cruise Control (ACC) for tracking a forwardly located vehicle radiates a transmission beam having a fan-shaped beam pattern, as illustrated in FIG. 1. However, when another vehicle driving in an oncoming lane uses the same ACC, the radar device of the other vehicle radiates the same signal, and thus interference (belonging to the problem depicted in FIG. 1) occurs.

At this time, the radar device uses polarization and interference is not generated when the polarization corresponds to cross polarization. However, since manufacturers of the radar device may selectively and freely use vertical polarization, horizontal polarization, or 45-degree polarization, the possibility of interference is high if the same polarization scheme is used, depending on the circumstances.

In order to prevent interference or overcome impediments to sensing an object due to an oncoming opposite vehicle, when an object is sensed, the present disclosure proposes a method of adjusting the radiation direction of a transmission beam such that the transmission beam does not face the sensed object, but, if a driving lane is changed, returns the radiation direction to an initial direction.

Hereinafter, an object-sensing system capable of solving the above-described problem will be described in detail.

Figure 2:
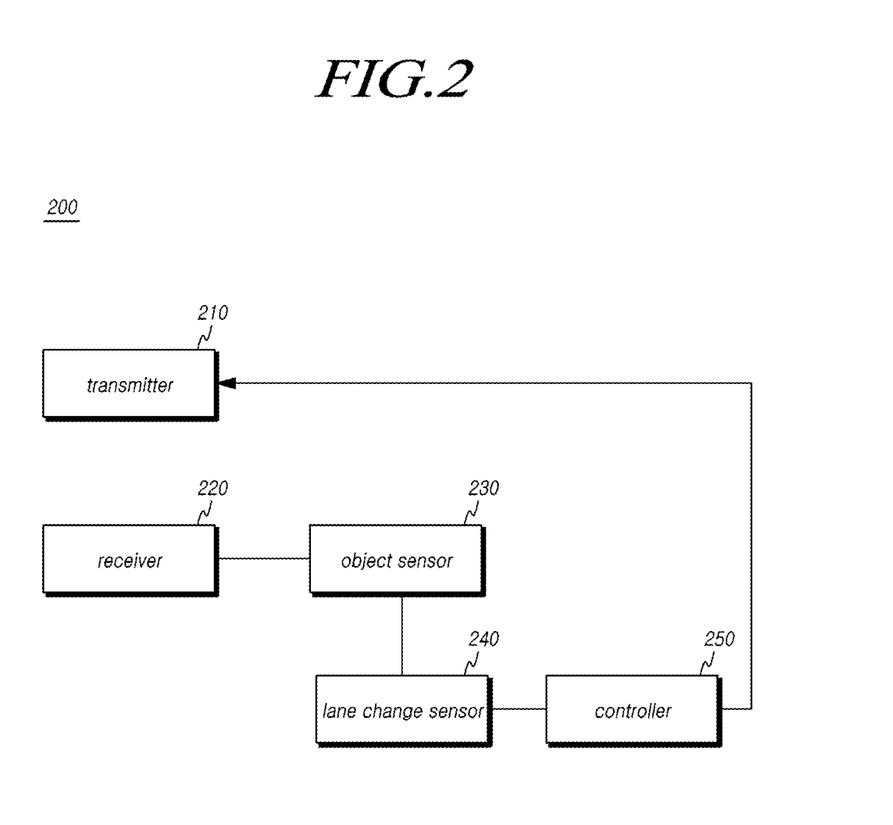
FIG. 2 illustrates the configuration of an object-sensing system according to an embodiment.

FIG. 2 illustrates the configuration of an object-sensing system according to an embodiment.

Referring to FIG. 2, an object-sensing system 200 according to an embodiment may include a transmitter 210 for transmitting a transmission beam in a radiation direction according to a control signal, a receiver 220 for receiving a reception beam in the radiation direction and outputting a sensing signal, an object sensor 230 for analyzing the sensing signal to sense an object, a lane change sensor 240 for sensing whether a driving lane is changed, and a controller 250 for outputting a control signal for changing the radiation direction to a first direction associated with the sensed object based on analysis of the sensing signal, and when the change in the driving lane is sensed, outputting a control signal for changing the radiation direction to a preset initial direction.

The transmitter 210 may transmit a transmission beam through an array antenna capable of changing a radiation direction. More specifically, when control signals having the same phase are input into respective unit array antennas included in the array antenna, the transmission beam may be transmitted in a radiation direction orthogonal to the arrangement of the unit array antennas. Alternatively, when control signals having different phases are input into the unit array antennas, the transmission beam may be transmitted in a certain radiation direction, which is not orthogonal to the arrangement of the unit array antennas. A control signal having different phases may be generated based on digital beamforming technology using an RF chip.

That is, an antenna including a plurality of array antennas is used. However, when control signals having different phases are input into respective unit array antennas, an adjustment to the radiation direction of the transmission beam may be made.

The receiver 220 may receive a reception beam through a plurality of arranged reception antennas and output a sensing signal. More specifically, the reception antenna may receive a reception beam, generate an analog signal, convert the analog signal into a digital signal, and output a sensing signal. Here, the receiver 220 may be set to receive the reception beam in the radiation direction, which is the direction in which the transmission beam is transmitted.

The object sensor 230 may analyze the output sensing signal and sense the object. For example, the object sensor 230 may generate one or more object location points based on the time spent transmitting the transmission beam and receiving the reception beam by the transmitter 210 and a component of the transmission beam, and may sense object information based on the one or more object location points. If the transmission beam corresponds to a Frequency Modulated Continuous Wave (FMCW), the frequency of which is modulated, the object sensor 230 may sense a location or a speed of the object based on a Doppler effect. Through the method, the object sensor 230 may sense whether the object is a stopped object, an object moving in the same direction, or an object moving in an opposite direction.

The lane change sensor 240 may sense whether a driving lane is changed through a detection sensor included in the vehicle. The detection sensor may include an image detection sensor capable of sensing a lane on the road, an external detection sensor capable of sensing facilities on the road, or an internal detection sensor capable of sensing transverse movement of the vehicle.

When the image detection sensor is used, the lane change sensor 240 may determine whether the vehicle changes the driving lane based on the number of sensed lanes or a change in the distance from the lane.

When the external detection sensor is used, the lane change sensor 240 may determine whether the vehicle changes the driving lane based on a change in the distance from the detected facilities.

When the internal detection sensor is used, the lane change sensor 240 may determine whether the vehicle changes the driving lane if the transverse movement of the vehicle is greater than or equal to preset threshold movement. The internal detection sensor may be a sensor capable of sensing a steering angle, a yaw rate, and a lateral acceleration.

The controller 250 may output a control signal for changing the radiation direction in which the transmission beam is transmitted to a first direction associated with the sensed object based on the analysis of the sensing signal output from the receiver 220. Further, when a change in the driving lane is sensed by the lane change sensor 240, the controller 250 may output a control signal for changing the radiation direction in which the transmission beam is transmitted to a preset initial direction.

Meanwhile, adjusting the radiation direction of the transmission beam according to the present disclosure may be as set forth in any of the following first to fifth examples, but is not limited thereto, and may be variously set in order to avoid interference from a forwardly located object.

Hereinafter, five cases of adjusting the direction of the transmission beam will be described as examples.

In the first example, when the sensing signal is analyzed such that white noise widely distributed in the frequency domain exists, the controller 250 may output the control signal to change the radiation direction of the transmission beam to the first direction. Here, "white noise" means noise including output of all frequencies within some frequency bands, wherein the relationship between a frequency and a rate including the component thereof follows the normal distribution. The frequency domain may be converted using a Fast Fourier Transform (FFT), and the first direction may be set based on information related to preset white noise. For example, as the distribution range of the frequency domain in which the white noise exists is wider, the first direction may be set to have a larger angular difference from the initial direction.

According to the first example, because the driving lane of the driver's vehicle is irrelevant, an additional sensor for sensing the driving lane of the driver's vehicle is not required.

In the second example, when the sensing signal is analyzed such that the impulse signal exists in the time domain, the controller 250 may output the control signal to change the radiation direction of the transmission beam to the first direction. The impulse signal refers to a single voltage, current, or pulse signal corresponding to a shock wave having a broad amplitude in an extremely short time, and the size of the amplitude may be calculated based on the smallest value among sensed values. The first direction may be set based on the relationship with a preset impulse signal. For example, as the number of sensed impulse signals is larger or the size of the impulse signal is larger, the first direction may be set to have a larger angular difference from the initial direction.

According to the second example, because of irrelevance of the driving lane of the driver's vehicle, an additional sensor for sensing the driving lane of the driver's vehicle is not required.

In the third example, when an oncoming opposite vehicle is sensed as an object, the controller 250 may output the control signal to change the radiation direction of the transmission beam to the first direction different from a direction in which the oncoming opposite vehicle exists.

This will be described with reference to FIG. 3.

Figure 3:
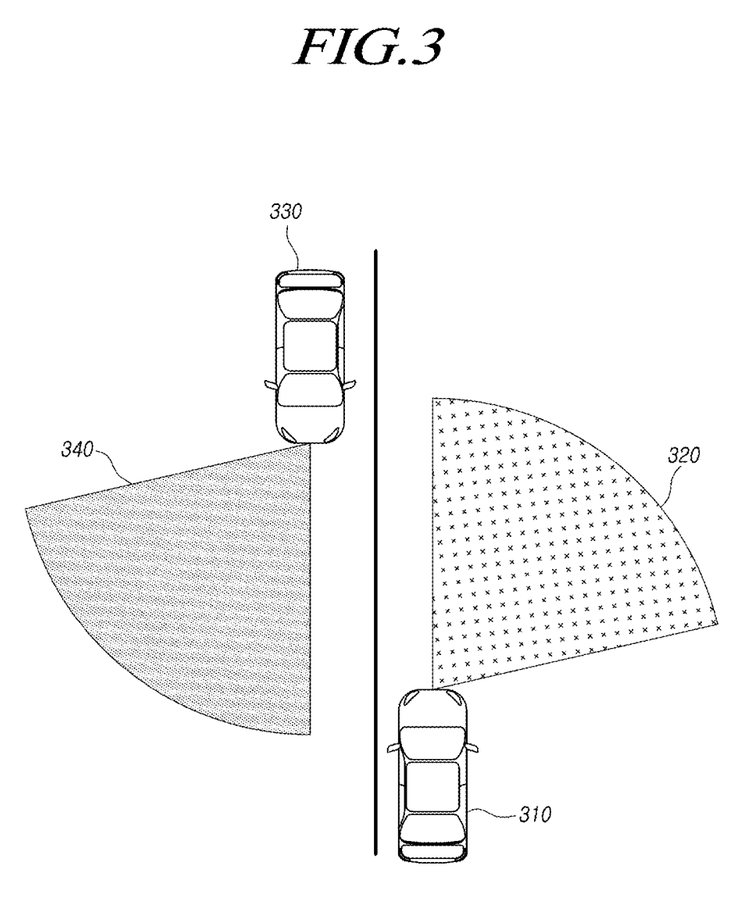
FIG. 3 illustrates an example for describing the operation of an object-sensing system according to an embodiment.

FIG. 3 illustrates an example for describing the operation of an object-sensing system according to an embodiment.

Referring to FIG. 3, when the magnitude of a relative speed of an object 330 is greater than the magnitude of an absolute speed of a driver's vehicle 310 or the magnitude of an absolute speed of the object 330, the object sensor 230 may sense the object 330 as an oncoming opposite vehicle. To this end, a speed sensor for sensing the absolute speed of the driver's vehicle 310, the absolute speed of the object 330, and the relative speed of the object 330 may be further included. The speed sensor may sense the absolute speed of the driver's vehicle 310 through a vehicle speed sensor or a wheel speed sensor, sense the absolute speed of the object 330 through a device capable of communicating with the object 330, and sense the relative speed of the object 330 through a camera sensor, but is not limited thereto.

The controller 250 according to the third example may output a control signal to transmit the transmission beam in a first direction 320, which is different from a direction (including a location and an angle) in which the object 330 sensed as an oncoming opposite vehicle exists. According to this operation, the transmission beam transmitted from the other vehicle 330 may be transmitted in a direction 340 different from the direction in which the driver's vehicle 310 exists. According to the third example, because the driving lane of the driver's vehicle is irrelevant, a sensor for sensing the driving lane of the driver's vehicle is not required.

Figure 4A:
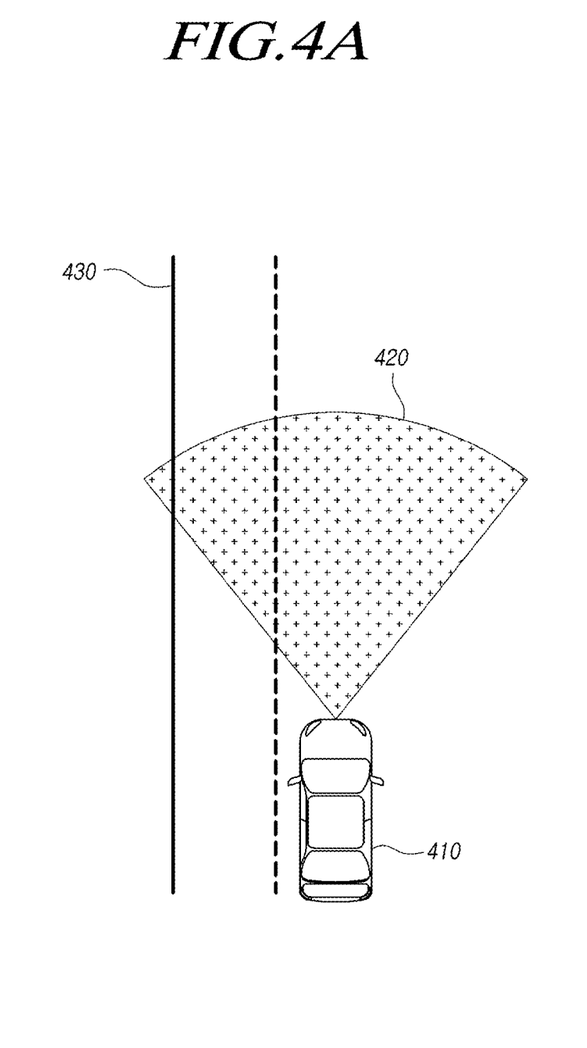
FIGS. 4A and 4B illustrate another example for describing the operation of the object-sensing system according to an embodiment.
Figure 4B:
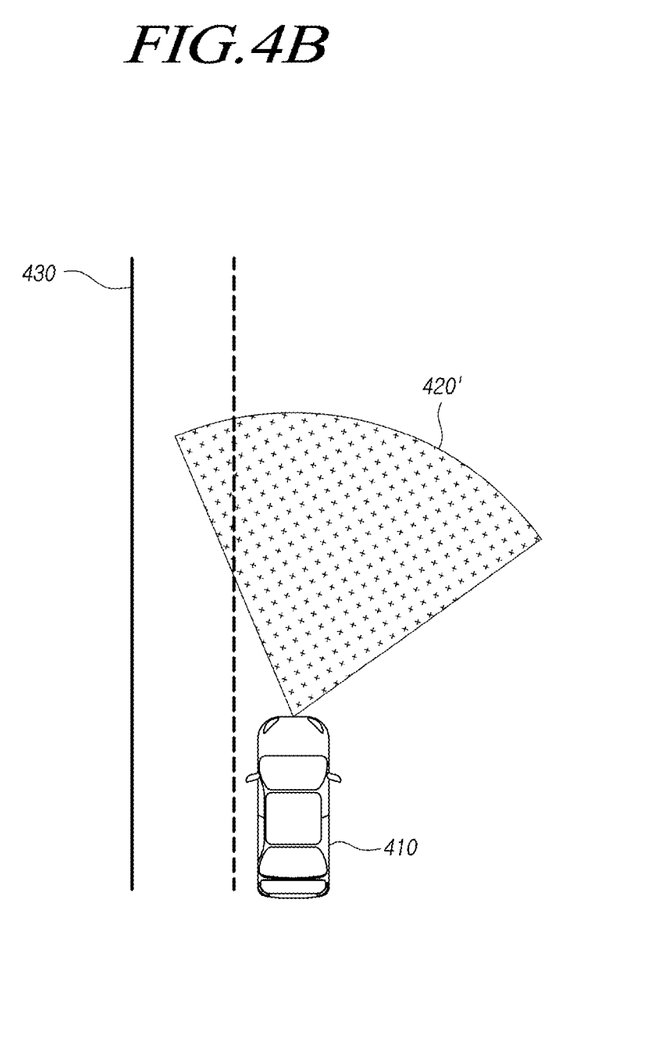

In the fourth example, when the object by which the driving lane can be estimated is sensed, the controller 250 may estimate the driving lane, set the first direction based on the estimated driving lane, and output the control signal to change the radiation direction of the transmission beam to the first direction. In the fourth example, the controller 250 may output a control signal for changing the radiation direction to an initial direction at preset time intervals in order to sense the object based on which the driving lane can be estimated. That is, according to the fourth example, the object-sensing system according to an embodiment has an effect in that the object-sensing system may operate using a basic sensor (a radar sensor serving as a sensor for receiving a reception beam by transmitting a transmission beam and for sensing an object) alone.

This will be described with reference to FIGS. 4A and 4B.

FIGS. 4A and 4B illustrate another example for describing the operation of the object-sensing system according to an embodiment.

Referring to FIG. 4A, the object sensor 230 may sense a median strip 430, which is an object based on which the driving lane can be estimated, based on a sensing signal output by a radiation direction 420. More specifically, the controller 250 may estimate the driving lane of a driver's vehicle 410 to be a second lane based on the distance from the median strip 430 and an already known lane width.

Referring to FIG. 4B, the controller 250 may set a first direction 420' in which the transmission beam does not go over the median strip 430 based on the estimated driving lane of the driver's vehicle 410. That is, the controller 250 may output a control signal to transmit the transmission beam in the first direction 420', in which the transmission beam does not go over the median strip 430.

Meanwhile, the controller 250 according to the fourth example may output a control signal for changing the radiation direction, in which the transmission beam is transmitted, to the initial direction at preset time intervals in order to sense road facilities including the median strip. According to the fourth example, there is an effect of performing the operation using a basic sensor (a radar sensor serving as a sensor for receiving a reception beam by transmitting a transmission beam and for sensing an object) alone.

In the fifth example, the controller 250 may set a first direction such that the transmission beam does not go over the opposite lane based on the detected driving lane. That is, the controller 250 may output a control signal such that the transmission beam is transmitted in the first direction, in which the transmission beam is not radiated to the opposite lane. To this end, a driving lane sensor for sensing a driving lane based on information output from an additional device, such as a camera sensor, an ultrasonic sensor, or a communication device may be further included.

When image information sensed by the camera sensor is used, the driving lane sensor may sense the driving lane on the basis of the number of lanes sensed to the left of the driver's vehicle (this is in accordance with a traffic flow convention of driving on the right, but may be based on the number of lanes sensed to the right of the driver's vehicle in a traffic flow convention of driving on the left) based on a preset color of the median strip (generally yellow). For example, when n (a natural number) white lane division lines are sensed as the lanes to the left of the driver's vehicle based on the color of the median strip, the driving lane sensor may sense that the driving lane is an $(n+1)^{th}$ lane.

When object information sensed by the ultrasonic sensor is used, the driving lane sensor may sense the driving lane based on the distance from preset road facilities (median strip, curb, and guardrail) and the lane width.

When location information sensed by the communication device is used, the driving lane sensor may sense the driving lane based on the location information and lane information corresponding to the location information. The lane information may be detected by the communication device or may be pre-stored in memory. According to the fifth example, there is an effect of reducing operation error through a simple operation attributable to the acquisition of driving lane information from an independent additional device.

As described above, it is possible to adjust the radiation direction of the transmission beam by applying the case of each of the first to fifth examples to the present disclosure, but the first to fifth examples may be applied in combination to more precisely adjust the radiation direction of the transmission beam.

That is, as the driving lane of the driver's vehicle is closer to the first lane, the controller 250 may output a control signal to transmit the transmission beam in a first direction having a large angular difference from the initial direction.

Meanwhile, when an analyzed change amount of the sensing signal is small, the controller 250 may have a limitation on outputting a control signal in which the analyzed change amount is not reflected. The limitation may be generated by external factors (for example, sensing performance deterioration or data processing performance deterioration). Further, when the driver's vehicle changes the driving lane to the outer side in the state in which the radiation direction is changed to the first direction, the transmission beam is not transmitted to the first lane, and thus an object located in the first lane may not be sensed.

In order to overcome the limitation, when a change in the driving lane is sensed, the controller 250 may change the radiation direction in which the transmission beam is transmitted, to the initial direction. Accordingly, the analyzed change amount increases, and the controller 250 may have the effect of outputting a more accurate control signal. Further, the transmission beam may be transmitted to the first lane even though the vehicle changes the driving lane to the outer side, so that an effect of sensing an object located in the first lane may be realized.

The object-sensing system according to an embodiment described with reference to FIGS. 2, 3, 4A, and 4B may block the erroneously received beam (meaning a directly received beam which is a transmission beam transmitted from another vehicle) depicted in FIG. 1, thereby solving a problem of erroneous sensing.

When a general radar sensor including LRR-10 having a bandwidth of 3 [dB] moves to the right side or the left side by 5 degrees through the object-sensing system according to an embodiment, it is expected that the problem mentioned in FIG. 1 can be solved.

The object sensor 230, the lane change sensor 240, and the controller 250 used for the object-sensing system 200 according to the embodiment may be implemented as partial modules of an integrated control device or an ECU installed in the vehicle.

The integrated control device or the ECU of the vehicle may include storage devices, such as a processor and a memory, and a computer program for performing a particular function, and the object sensor 230, the lane change sensor 240, and the controller 250 may be implemented as software modules capable of performing unique functions.

Hereinafter, an object-sensing method corresponding to the operation performed by the object-sensing system described with reference to FIGS. 2, 3, 4A, and 4B will be briefly described.

Figure 5:
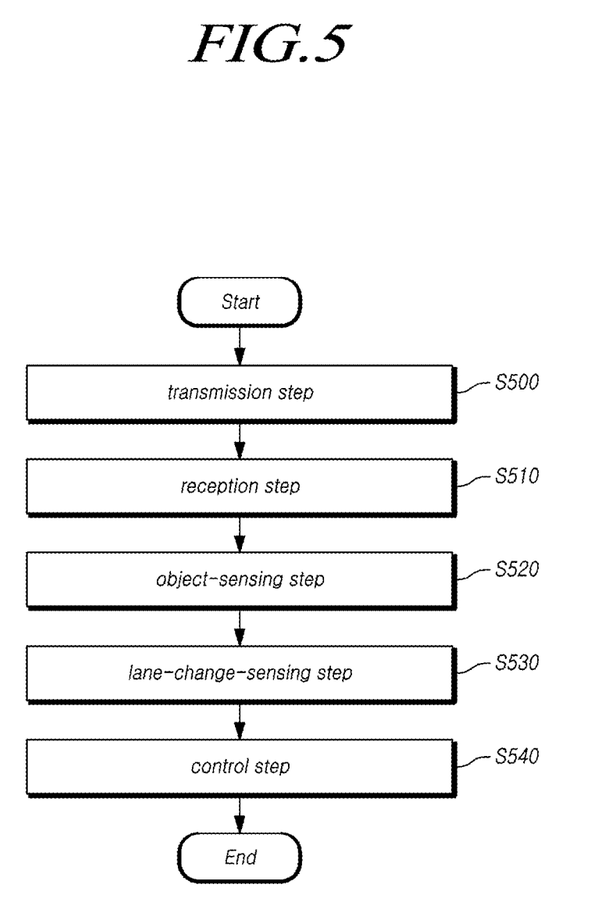
FIG. 5 is a flowchart illustrating an object-sensing method according to an embodiment.

FIG. 5 is a flowchart illustrating an object-sensing method according to an embodiment.

Referring to FIG. 5, the object-sensing method according to an embodiment may include a transmission step S500 of transmitting a transmission beam in a radiation direction according to a control signal, a reception step S510 of receiving a reception beam in the radiation direction and outputting a sensing signal, an object-sensing step S520 of analyzing the sensing signal and sensing an object, a lane-change-sensing step S530 of sensing whether a driving lane is changed, and a control step S540 of outputting a control signal for changing the radiation direction to a first direction associated with the sensed object based on the analysis of the sensing signal, and, when a change in the driving lane is sensed, outputting a control signal for changing the radiation direction to a preset initial direction.

The transmission step S500 may transmit a transmission beam through an array antenna capable of changing a radiation direction. More specifically, when control signals having the same phase are input into respective unit array antennas included in the array antenna, the transmission beam may be transmitted in a radiation direction orthogonal to the arrangement of the unit array antennas. Alternatively, when control signals having different phases are input into the unit array antennas, the transmission beam may be transmitted in a certain radiation direction, which is not orthogonal to the arrangement of the unit array antennas. The control signal having different phases may be generated based on digital beamforming technology using an RF chip.

That is, an antenna including a plurality of array antennas is used. However, when control signals having different phases are input into respective unit array antennas, adjustment to the radiation direction of the transmission beam may be made.

The reception step S510 may receive a reception beam through a plurality of arranged reception antennas and output a sensing signal. More specifically, the reception antenna may receive a reception beam, generate an analog signal, convert the analog signal into a digital signal, and output a sensing signal. Here, the reception step S510 may perform setting such that the reception beam is received in the radiation direction in which the transmission beam is transmitted.

The object-sensing step S520 may sense an object by analyzing the output sensing signal. More specifically, the object-sensing step S520 may generate one or more object location points based on the time spent transmitting the transmission beam in the transmission step S500 and receiving the reception beam and a component of the transmission beam, and may sense the object based on the one or more object location points. Through the method, the object sensor 230 may sense whether the object is a stopped object, an object moving in the same direction, or an object moving in the opposite direction.

The lane-change-sensing step S530 may sense whether the driving lane is changed through a detection sensor included in the vehicle. The detection sensor may include an image detection sensor capable of sensing a lane on the road, an external detection sensor capable of sensing facilities on the road, or an internal detection sensor capable of sensing transverse movement of the vehicle.

When the image detection sensor is used, the lane-change-sensing step S530 may determine whether the vehicle changes the driving lane based on the number of sensed lanes or a change in the distance from the lane.

When the external detection sensor is used, the lane-change-sensing step S530 may determine whether the vehicle changes the driving lane based on a change in the distance from sensed facilities.

When the internal detection sensor is used, the lane-change-sensing-step S530 may determine whether the vehicle changes the driving lane if the transverse movement of the vehicle is greater than or equal to preset threshold movement. The internal detection sensor may be a sensor capable of sensing a yaw rate or lateral acceleration.

The control step S540 may output a control signal for changing the radiation direction in which the transmission beam is transmitted to a first direction associated with the sensed object based on the analysis of the sensing signal output in the reception step S510. Further, when the change in the driving lane is sensed in the lane-change-sensing step S530, the control step S540 may output a control signal for changing the radiation direction in which the transmission beam is transmitted to the preset initial direction.

Meanwhile, when an analyzed change amount of the sensing signal is small, the control step S540 may have a limitation of outputting a control signal in which the analyzed change amount is not reflected. The limitation may be generated by external factors (for example, sensing performance deterioration or data processing performance deterioration). Further, when the driver's vehicle changes the driving lane to the outer side in the state in which the radiation direction is changed to the first direction, the transmission beam is not transmitted to the first lane, and thus an object located in the first lane may not be sensed.

In order to overcome this limitation, when a change in the driving lane is sensed, the control step S540 may change the radiation direction, in which the transmission beam is transmitted, to the initial direction.

The control step S540 may operate as illustrated in FIGS. 6, 7, 8, and 9, but is not limited thereto, and may include any case in which the radiation direction can be changed to avoid interference from a forwardly located object.

Figure 6:
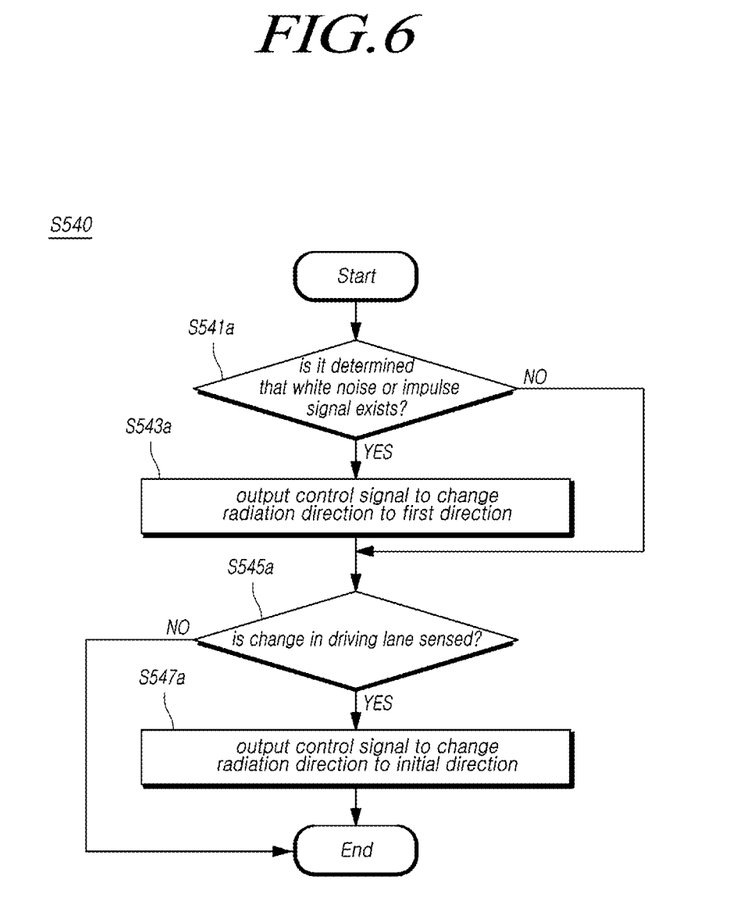
FIG. 6 illustrates a first example for describing the operation of a control step according to an embodiment.

The control step S540 may operate as illustrated in FIG. 6.

FIG. 6 illustrates a first example for describing the operation of the control step according to an embodiment.

Referring to FIG. 6, the control step may determine whether it is analyzed that there is white noise widely distributed in a frequency domain and an impulse signal in a time domain in step S541a. Here, "white noise" means noise including outputs of all frequencies within some frequency bands, wherein the relationship between a frequency and a rate including the component thereof follows the normal distribution, and "impulse signal" refers to a single voltage, current, or pulse signal corresponding to a shock wave having a broad amplitude in an extremely short time, wherein the amplitude may be calculated based on the smallest value among sensed values. Further, the frequency domain may be converted using Fast Fourier Transform (FFT).

When it is determined that the white noise or the impulse signal exists (YES) in step S541, the control step may output a control signal to change the radiation direction of the transmission beam to a first direction in step S543a. The first direction may be set based on information related to preset white noise. For example, when the distribution range of the frequency domain in which the white noise exists is wider, the first direction may be set to have a larger angular difference from the initial direction.

When step S543a is performed or when NO is determined in step S541a, the control step may determine whether a change in the driving lane is sensed in step S545a.

When it is determined that a change in the driving lane is sensed (YES) in step S545a, the control step may output a control signal to change the radiation direction of the transmission beam to the initial direction in step S547a.

According to the control step S540 of FIG. 6, because of irrelevance of the driving lane of the driver's vehicle, an additional sensor for sensing the driving lane of the driver's vehicle is not required.

Figure 7:
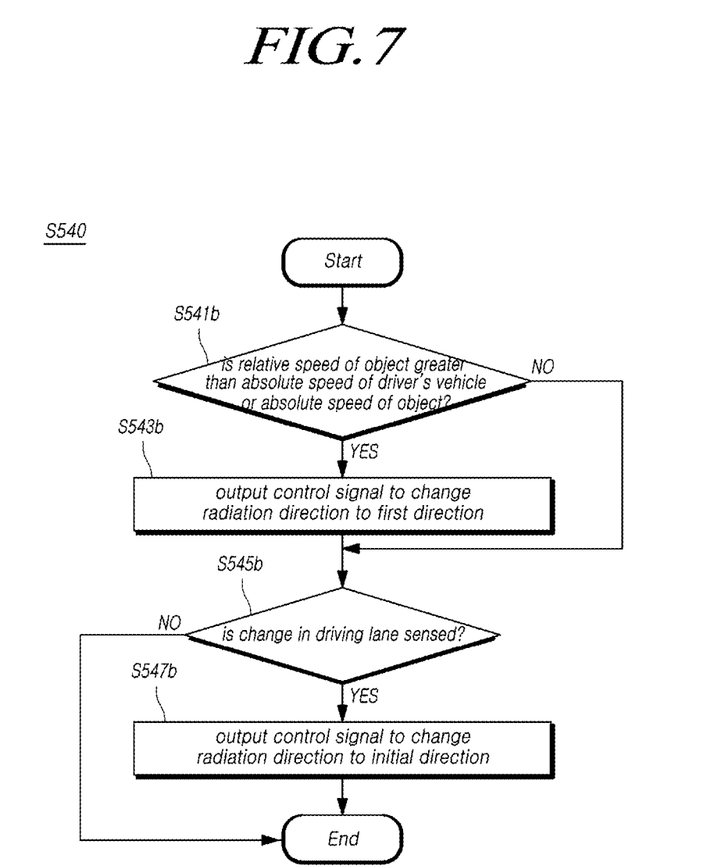
FIG. 7 illustrates a second example for describing the operation of the control step according to an embodiment.

Alternatively, the control step S540 may operate as illustrated in FIG. 7.

FIG. 7 illustrates a second example for describing the operation of the control step according to an embodiment.

Referring to FIG. 7, the control step may determine whether the magnitude of a relative speed of the object is greater than the magnitude of an absolute speed of the driver's vehicle or the magnitude of an absolute speed of the object in step S541b. To this end, a speed-sensing step of sensing the absolute speed of the driver's vehicle, the absolute speed of the object, and the relative speed of the object may be performed in advance. The speed-sensing step may sense the absolute speed of the driver's vehicle through a vehicle speed sensor or a wheel speed sensor, sense the absolute speed of the object through a device capable of communicating with the object, and sense the relative speed of the object through a camera sensor, but is not limited thereto.

When it is determined that the magnitude of the relative speed of the object is greater than the magnitude of the absolute speed of the driver's vehicle or the magnitude of the absolute speed of the object (YES) in step S541b, the control step may output a control signal to change the radiation direction of the transmission beam to the first direction in step S543b.

When step S543b is performed, or when NO is determined in step S541b, the control step may determine whether a change in the driving lane is sensed in step S545b.

When it is determined that a change in the driving lane is sensed (YES) in step S545b, the control step may output a control signal to change the radiation direction of the transmission beam to the initial direction in step S547b.

According to the control step S540 of FIG. 7, because of irrelevance of the driving lane of the driver's vehicle, an additional sensor for sensing the driving lane of the driver's vehicle is not required.

Figure 8:
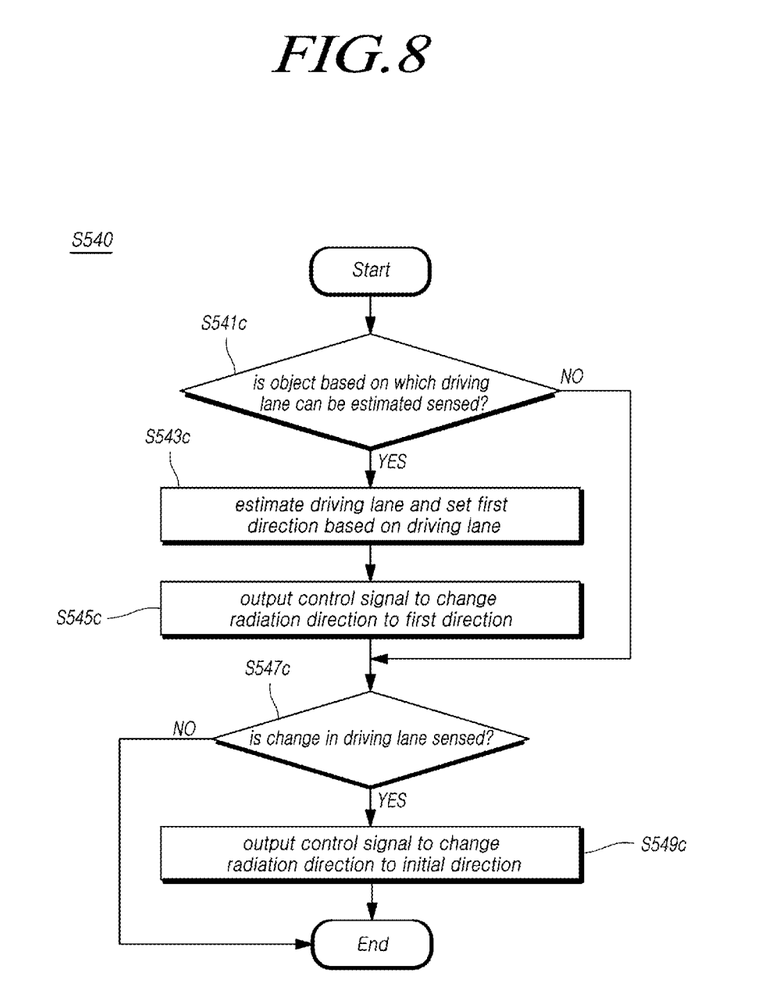
FIG. 8 illustrates a third example for describing the operation of the control step according to an embodiment.

Alternatively, the control step S540 may operate as illustrated in FIG. 8.

FIG. 8 illustrates a third example for describing the operation of the control step according to an embodiment.

Referring to FIG. 8, the control step may determine whether an object based on which the driving lane can be estimated is sensed in step S541c. The object based on which the driving lane can be estimated may be a facility on the road including a median strip.

When it is determined that an object based on which the driving lane can be estimated is sensed (YES) in step S541c, the control step may estimate the driving lane and set a first direction based on the driving lane in step S543c. For example, in step S543c, whether the driving lane is a first lane, a second lane, or another lane may be estimated using the distance from the object based on which the driving lane can be estimated and an already known lane width. Accordingly, in step S543c, the first direction, in which the transmission beam is not transmitted to the opposite lane, may be set based on the estimated driving lane.

When step S543c is performed, the control step may output a control signal to change the radiation direction in which the transmission beam is transmitted to the first direction in step S545c.

When step S545c is performed or when NO is determined in step S541c, the control step may determine whether a change in the driving lane is sensed in S547c.

When it is determined that a change in the driving lane is sensed (YES) in step S547c, the control step may output a control signal to change the radiation direction of the transmission beam to the initial direction in S549c.

Meanwhile, the control step of FIG. 8 may output a control signal to change the radiation direction in which the transmission beam is transmitted to the initial direction at preset time intervals in order to sense road facilities including the median strip. That is, in FIG. 8, the object-sensing method according to an embodiment may be implemented using a basic sensor (a radar sensor for receiving a reception beam by transmitting a transmission beam to sense an object) alone.

Figure 9:
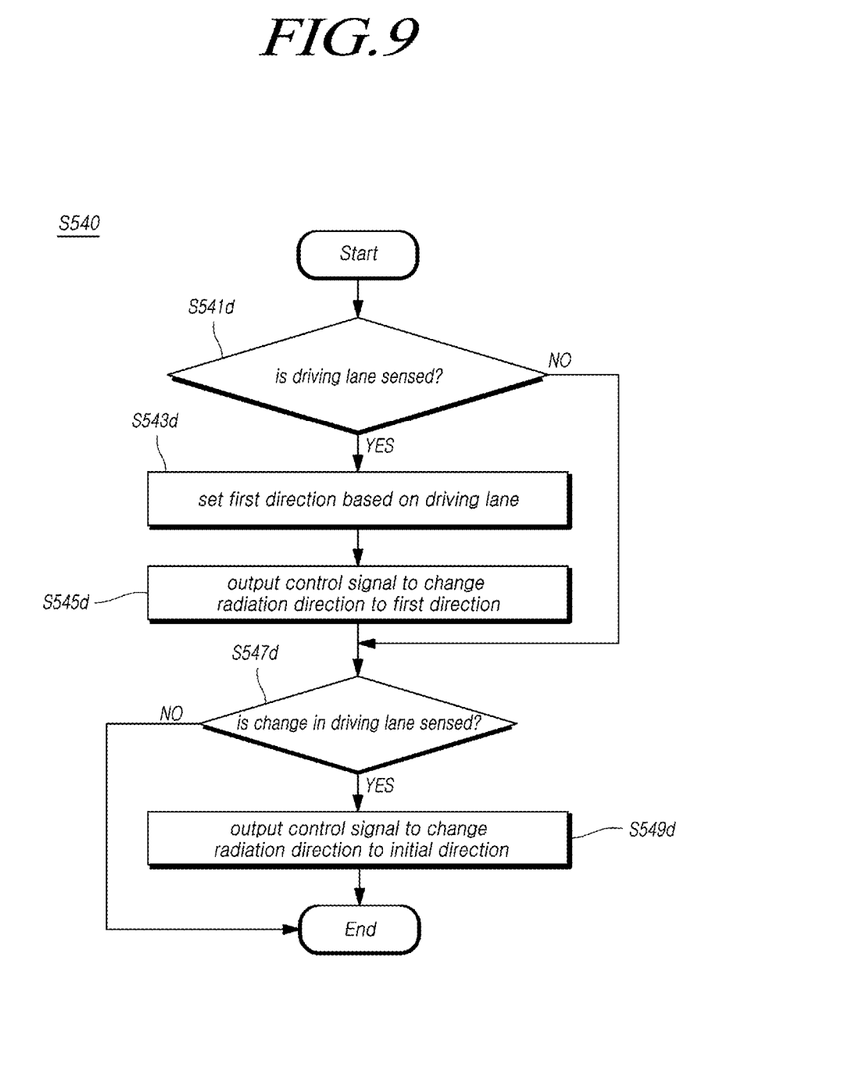
FIG. 9 illustrates a fourth example for describing the operation of the control step according to an embodiment.

Alternatively, the control step S540 may operate as illustrated in FIG. 9.

FIG. 9 illustrates a fourth example for describing the operation of the control step according to an embodiment.

Referring to FIG. 9, the control step may determine whether a driving lane is sensed in step S541d. To this end, a driving-lane-sensing step of sensing the driving lane based on image information may be performed in advance. Here, the driving-lane-sensing step may sense the driving lane based on information other than the image information.

When it is determined that the driving lane is sensed (YES) in step S541d, the control step may set a first direction based on the driving lane in step S543d. For example, in step S543d, the first direction may be set such that the transmission beam is not transmitted to the opposite lane based on the estimated driving lane.

When step S543d is performed, the control step may output a control signal to change the radiation direction in which the transmission beam is transmitted to the first direction in step S545d.

When step S545d is performed, or when NO is determined in step S541d, the control step may determine whether a change in the driving lane is sensed in S547d.

When it is determined that a change in the driving lane is sensed (YES) in step S547d, the control step may output a control signal to change the radiation direction of the transmission beam to the initial direction in S549d.

According to the control step S540 performed as illustrated in FIG. 9, there is an effect of performing the control step using a basic sensor (a radar sensor for receiving a reception beam by transmitting a transmission beam to sense an object) alone.

In addition, in the object-sensing method, all operations performed by the object-sensing system described with reference to FIGS. 2, 3, 4A, and 4B may be performed.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An object-sensing system for a vehicle comprising:
   a transmitter configured to transmit a transmission beam toward a target in a radiation direction according to a first control signal;
   a receiver configured to receive a reception beam from the target in a same direction as the radiation direction and output a sensing signal;
   an object sensor configured to sense whether the target is an object moving in a same direction as the vehicle or an object moving in an oncoming lane in an opposite direction to the vehicle by analyzing the sensing signal;
   a lane change sensor configured to sense whether a driving lane is changed; and
   a controller configured to:
      output the first control signal for transmitting the transmission beam in the radiation direction corresponding to a preset initial direction;
      output a second control signal for changing the radiation direction to a first direction different from a direction in which the target exists in response to a determination that the target is sensed to be the object moving in the oncoming lane based on the analysis of the sensing signal; and
      output a third control signal for changing the radiation direction to the preset initial direction based on a determination that the driving lane is changed.

2. The object-sensing system of claim 1, wherein the controller outputs the second control signal for changing the radiation direction to the first direction when the sensing signal is analyzed such that white noise widely distributed in a frequency domain exists.

3. The object-sensing system of claim 1, wherein the controller outputs the second control signal for changing the radiation direction to the first direction when the sensing signal is analyzed such that an impulse signal exists in a time domain.

4. The object-sensing system of claim 1, wherein the controller outputs the second control signal for changing the radiation direction to the first direction different from a direction in which an oncoming opposite vehicle exists when the oncoming opposite vehicle is sensed as the target.

5. The object-sensing system of claim 4, further comprising a speed sensor configured to sense an absolute speed of a driver's vehicle, an absolute speed of the target, and a relative speed of the target,
wherein the object sensor senses the target as the oncoming opposite vehicle when a magnitude of the relative speed of the target is greater than a magnitude of the absolute speed of the driver's vehicle or a magnitude of the absolute speed of the target.

6. The object-sensing system of claim 1, wherein the controller estimates the driving lane, sets the first direction based on the driving lane, and outputs the second control signal for changing the radiation direction to the first direction when a median strip by which the driving lane can be estimated is sensed as the target.

7. The object-sensing system of claim 6, wherein the controller outputs the third control signal for changing the radiation direction to the initial direction at preset time intervals in order to sense the median strip by which the driving lane can be estimated.

8. The object-sensing system of claim 1, further comprising a driving lane sensor configured to sense the driving lane,
wherein the controller sets the first direction based on the driving lane and outputs the second control signal for changing the radiation direction to the first direction.

9. An object-sensing method for a vehicle comprising:
a transmission step of transmitting a transmission beam toward a target in a radiation direction according to a first control signal;
a reception step of receiving a reception beam from the target in a same direction as the radiation direction and outputting a sensing signal;
an object-sensing step of sensing whether the target is an object moving in a same direction as the vehicle or an object moving on an oncoming lane in an opposite direction to the vehicle by analyzing the sensing signal;
a lane-change-sensing step of sensing whether a driving lane is changed; and
control steps of:
outputting the first control signal for transmitting the transmission beam in the radiation direction corresponding to a preset initial direction;
outputting a second control signal for changing the radiation direction to a first direction different from a direction in which the target exists in response to a determination that the target is sensed to be the object moving in the oncoming lane based on the analysis of the sensing signal; and
outputting a third control signal for changing the radiation direction to the preset initial direction based on a determination that the driving lane is changed.

10. The object-sensing method of claim 9, wherein the control step comprises outputting the second control signal for changing the radiation direction to the first direction when the sensing signal is analyzed such that white noise widely distributed in a frequency domain exists.

11. The object-sensing method of claim 9, wherein the control step comprises outputting the second control signal for changing the radiation direction to the first direction when the sensing signal is analyzed such that an impulse signal exists in a time domain.

12. The object-sensing method of claim 9, wherein the control step comprises outputting the second control signal for changing the radiation direction to the first direction, different from a direction in which an oncoming opposite vehicle exists, when the oncoming opposite vehicle is sensed as the target.

13. The object-sensing method of claim 12, further comprising a speed-sensing step of sensing an absolute speed of a driver's vehicle, an absolute speed of the target, and a relative speed of the target,
wherein the object-sensing step comprises sensing the target as the oncoming opposite vehicle when a magnitude of the relative speed of the target is greater than a magnitude of the absolute speed of the driver's vehicle or a magnitude of the absolute speed of the target.

14. The object-sensing system of claim 1, wherein
the transmission beam has a fan-shaped beam pattern directed from the transmitter to the target from a top view, and
interference due to a transmission beam from the object moving in the oncoming lane is minimized by changing the radiation direction to the first direction such that the fan-shaped beam pattern does not overlap with the oncoming lane.

15. The object-sensing method of claim 9, wherein
the transmission beam has a fan-shaped beam pattern directed from the transmitter to the target from a top view, and
interference due to a transmission beam from the object moving in the oncoming lane is minimized by changing the radiation direction to the first direction such that the fan-shaped beam pattern does not overlap with the oncoming lane.

* * * * *